(12) United States Patent
Anand et al.

(10) Patent No.: US 7,895,077 B2
(45) Date of Patent: Feb. 22, 2011

(54) PREDICTING INVENTORY AVAILABILITY AND PRIORITIZING THE SERVING OF COMPETING ADVERTISEMENTS BASED ON CONTRACT VALUE

(75) Inventors: Shubhasheesh Anand, Mountain View, CA (US); Michael Clothier, San Jose, CA (US); Armin Ebrahimi, Los Gatos, CA (US); Bhavesh Mehta, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1407 days.

(21) Appl. No.: 10/799,048

(22) Filed: Mar. 11, 2004

(65) Prior Publication Data

US 2005/0203796 A1    Sep. 15, 2005

(51) Int. Cl.
*G06Q 30/00* (2006.01)
(52) U.S. Cl. .................................. 705/14.42
(58) Field of Classification Search ............ 705/14
See application file for complete search history.

(56) References Cited

U.S. PATENT DOCUMENTS

| 5,848,397 | A  | * | 12/1998 | Marsh et al. ............. 705/14 |
| 5,933,811 | A  |   | 8/1999  | Angles et al. |
| 5,948,061 | A  | * | 9/1999  | Merriman et al. ......... 709/219 |
| 6,253,189 | B1 |   | 6/2001  | Feezell et al. |
| 6,487,538 | B1 | * | 11/2002 | Gupta et al. ............. 705/14 |
| 6,760,916 | B2 |   | 7/2004  | Holtz et al. |
| 6,804,659 | B1 | * | 10/2004 | Graham et al. ........... 705/14 |
| 6,907,566 | B1 | * | 6/2005  | McElfresh et al. ........ 715/210 |
| 6,928,414 | B1 |   | 8/2005  | Kim |
| 7,100,111 | B2 | * | 8/2006  | McElfresh et al. ........ 715/207 |
| 7,249,059 | B2 | * | 7/2007  | Dean et al. .............. 705/26 |
| 7,373,599 | B2 | * | 5/2008  | McElfresh et al. ........ 705/26 |
| 7,472,102 | B1 | * | 12/2008 | Heckerman et al. ....... 706/47 |
| 7,562,064 | B1 | * | 7/2009  | Chickering et al. ....... 706/62 |
| 2001/0056489 | A1 |   | 12/2001 | Ariga |
| 2002/0128904 | A1 | * | 9/2002 | Carruthers et al. ....... 705/14 |
| 2002/0133398 | A1 | * | 9/2002 | Geller et al. ........... 705/14 |
| 2003/0028432 | A1 |   | 2/2003 | Troyansky et al. |
| 2003/0101454 | A1 | * | 5/2003 | Ozer et al. ............. 725/42 |

(Continued)

FOREIGN PATENT DOCUMENTS

KR      2001000688 A      1/2001

(Continued)

OTHER PUBLICATIONS

Dukes et al. "Negotiations and Exclusivity Contracts for Advertising," Marketing Science, Spring 2003.*

(Continued)

*Primary Examiner*—C. M Tarae
(74) *Attorney, Agent, or Firm*—Hickman Palermo Truong & Becker LLP (57) ABSTRACT

Techniques are provided for selecting among the advertisements that are competing for a slot based, at least in part, on the potential revenue amounts associated with the advertisements. Each of the potential revenue amounts may, for example, reflects a value that a provider expects to receive in exchange for the provider's performance of the delivery obligations associated with the advertisements. Other factors may also be considered in selecting among the competing advertisements, such as whether the slot has been reserved for buyers that satisfy a set of criteria.

18 Claims, 4 Drawing Sheets

U.S. PATENT DOCUMENTS

| | | | |
|---|---|---|---|
| 2003/0130887 A1* | 7/2003 | Nathaniel | 705/14 |
| 2003/0135460 A1 | 7/2003 | Talegon et al. | |
| 2003/0149618 A1 | 8/2003 | Sender et al. | |
| 2004/0003398 A1 | 1/2004 | Donian et al. | |
| 2004/0103024 A1* | 5/2004 | Patel et al. | 705/14 |
| 2005/0149396 A1* | 7/2005 | Horowitz et al. | 705/14 |
| 2010/0082439 A9* | 4/2010 | Patel et al. | 705/14.72 |

FOREIGN PATENT DOCUMENTS

| | | | |
|---|---|---|---|
| WO | WO 97/21183 | * | 6/1997 |
| WO | WO 03/052651 A2 | | 6/2003 |

OTHER PUBLICATIONS

"Notification of Transmittal of the International Search Report and the Written Opinion of the International Searching Authority, or the Declaration" for corresponding PCT International application No. PCT/US05/08230.

Notification of Transmittal of the International Search Report and the Written Opinion of the International Searching Authority, or the Declaration received in International application No. PCT/US04/27511.

"Notification Concerning Transmittal of International Preliminary Report on Patentability (Chapter 1 of the Patent Cooperation Treaty)" received in corresponding International application No. PCT/US2005/008230.

International Searching Authority, "Notification of Transmittal of the International Search Report and the Written Opinion of the International Searching Authority, or the Declaration," PCT/US2005/008230, 8 pages.

Current Claims, PCT/US2005/008230, 4 pages.

U.S. Appl. No. 09/558,755, filed Apr. 21, 2000, incorporated by reference into US Patent Application Publication 2002/0128904 (Carruthers et al.), 23 pages.

* cited by examiner

PREDICTING INVENTORY AVAILABILITY AND PRIORITIZING THE SERVING OF COMPETING ADVERTISEMENTS BASED ON CONTRACT VALUE

RELATED APPLICATIONS

This application is related to U.S. application Ser. No. 10/648,599, entitled "SELECTING AMONG ADVERTISEMENTS COMPETING FOR A SLOT ASSOCIATED WITH ELECTRONIC CONTENT DELIVERED OVER A NETWORK," filed Aug. 25, 2003 by BHAVESH MEHTA and MICHAEL D. BIGBY, the contents of which are incorporated herein by reference for all purposes.

FIELD OF THE INVENTION

The present invention relates to delivering advertisements with electronic content provided over a network and, more specifically, to techniques for selecting among advertisements that are competing for a slot associated with electronic content that is to be delivered over a network.

BACKGROUND OF THE INVENTION

Electronic content is delivered to network users in many forms, such as email, web pages, audio streams, video streams and Java applets. Many companies (hereinafter "advertisers") advertise their wares and services by paying popular content providers (hereinafter "providers") to include the advertisers' advertisements in the providers' content as that content is delivered to users.

Just as the form of the content may vary, so too may the form of the advertisement. For example, when the content is a web page the advertisement may be a banner ad. When the content is an email message, the advertisement may be text in a tag line. When the content is a stream of music or video, the advertisement may be a sound bite or video clip. The techniques described herein are not limited to any particular form of network-delivered content or advertisements.

The effectiveness of an advertisement greatly depends on the circumstances under which it is received. For example, an advertisement about football merchandise is more likely to be effective when viewed by people interested in football, than when viewed by people interested in breakthroughs in the treatment of arthritis. Consequently, the contract between the advertiser and the provider frequently specifies the criteria under which the provider will provide an advertisement. Such conditions, referred to herein as the "delivery criteria" of the advertisement, may include such specifics as (1) the manner of including the advertisement in the content (e.g. what size and position on a web page), (2) criteria for content that the advertisement will accompany, and (3) criteria for the users to whom the advertisement should be delivered. For example, a seller of football merchandise may require that its advertisement be delivered on the top of pages that contain news stories relating to football, and where the recipients are males between the ages of 20 and 50.

In addition to the delivery criteria, the contract between the advertiser and the provider also identifies specific "delivery obligations". The delivery obligations set forth the advertisers obligations relative to delivering the advertisement. The delivery obligation for a particular advertisement may, for example, obligate the provider to provide 10,000 "ad-views" of the advertisement during a particular time period. Each time a content provider provides to a user content that includes the particular advertisement, an "ad-view" of the particular advertisement is said to have occurred.

An ad-view is merely one form of "service unit" that an advertiser may purchase from a provider. Various other forms of service units are possible, including but not limited to: actual click-throughs on advertisements, actual viewing time of advertisements, actual orders resulting from advertisements, etc. The techniques described herein are not limited to any particular form of service unit.

For the purpose of explanation, a particular delivery of a particular piece of content can be considered to have a specific number of "slots" into which advertisements may be placed. For example, a particular web page that is being delivered to a particular user may include two slots for advertisements: one slot for a horizontal banner at the top of the page, and one slot for vertical banner on the right hand side of the page. Similarly, a particular video feed may have one slot for a one-minute video clip advisement at the start of the feed, and one slot for a two-minute video clip advertisement during the middle of the feed.

Each slot is associated with a set of "slot attributes". The slot attributes associated with a slot may include, for example, the nature of the content that contains the slot, the size and placement of the slot within that content, and the characteristics of the user to which the content is being delivered. For example, a slot may have the attributes: "content=web page containing sports story", "recipient=29 year old male", "size=large banner", "placement=top of page". To determine whether a particular advertisement can be placed in a particular slot, the delivery criteria of the advertisement are compared to the slot attributes of the slot.

To maximize revenue, providers typically attempt to enter into contracts with enough advertisers to ensure that every slot of every piece of delivered content is filled by a paid advertisement. Thus, a provider typically enters agreements with many advertisers. As a consequence, it is possible for multiple advertisements to qualify for the same slot.

For example, assume that a provider considers it optimal to display a single advertisement on web pages that include stories about sports. Thus, each page about sports that the provider delivers to a user has a single slot. Further assume that the provider has contracted with one advertiser to provide 2,000 ad-views of advertisement X on pages that contain sports stories during a particular month, and with another advertiser to provide 1,000 ad-views of advertisement Y on pages that contain sports stories during that same month. Under these circumstances, both advertisement X and advertisement Y qualify for inclusion in the slot of web pages that contain sports stories. Consequently, during that particular month, every time the provider is to deliver a web page containing a sports story, the provider must determine whether to include advertisement X or advertisement Y.

Thus, from the perspective of the provider, there are many circumstances where multiple advertisements are "competing" for the same slot. The simplest technique for dealing with such situations is for the advertiser to simply provide one advertisement until that advertisement's delivery obligations have been satisfied, and then move on to the next competing advertisement and do the same. For example, the advertiser may simply provide advertisement X with the first 2,000 pages that contain a sports story, and then provide advertisement Y with the next 1,000 pages that contain a sports story.

Unfortunately, it may turn out that the provider receives insufficient requests for particular types of content to satisfy all of its delivery obligations. For example, during the month in which the provider has contracted to provide ad-views for advertisements X and Y, the provider may only receive 2000 requests for sports stories. Under these conditions, the content provider would not be able to satisfy its delivery obligations for both advertisement X and advertisement Y. Situations in which the content requests received by a provider do not allow the provider to achieve all of its delivery obligations are referred to herein as "shortfall" situations. How providers deal with shortfall situations can greatly affect the satisfaction level of the advertisers.

One technique for handling multiple competing delivery obligations involves using a "behindness" measure to select among the advertisements that are competing for a slot. In general, the behindness value of an advertisement reflects how far behind the provider is on satisfying the delivery obligations associated with the advertisement. For example, a behindness measure may indicate what percentage of the advertisement's delivery obligation will not be satisfied given (1) how much of the delivery obligation has been satisfied, and (2) how much of the obligation period has passed.

For example, assume that the provider is obligated to provide 2000 ad-views of advertisement X during a particular month. If the provider has provided 1000 ad-views of advertisement X when the month is half over, then the provider is "on track" relative to the delivery obligations of advertisement X, and the behindness value for advertisement X is 1 (50% obligation remaining/50% time-remaining). On the other hand, if the provider has only provided 500 ad-views of advertisement X when the month is half over, then advertisement X has a behindness value of 1.5 (75% obligation remaining/50% time-remaining). This is merely one example of how a behindness value may be calculated. The techniques described herein are not limited to any particular formula for calculating a behindness value.

One way of using a behindness measure to select among the advertisements that are competing for a slot involves always selecting the qualifying advertisement with the highest behindness value. By selecting the qualifying advertisement with the highest behindness value, the provider ensures that approximately the same percentage of every order is satisfied during a shortfall situation.

Unfortunately, the most-behind-first approach has some significant disadvantages. For example, a latecomer advertiser may be interested in advertising in slots that are already subject to several pre-existing obligations. If the latecomer advertiser becomes aware of the pre-existing obligations, the advertiser may contract for a much higher delivery obligation than the advertiser actually desires. Such a contract could significantly reduce the number of slots assigned to the previously contracted advertisers while unfairly granting the latecomer advertiser the number of slots that the advertiser actually desired. In addition, because the most-behind-first approach does not take into account of the value of the contract, if the latecomer advertiser offers a lower value for the contract than the previously contracted advertisers, the provider could be obligated to fulfill the higher delivery obligations at a lower revenue level.

Based on the foregoing, it is desirable to provide a technique for selecting which advertisement to include in a particular slot, when a number of advertisements are competing for inclusion in the same slot. It is further desirable that the selection technique provides a fair and efficient way of dealing with the shortcomings of the most-behind-first approach.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Techniques are provided for selecting among advertisements that are competing for a slot associated with electronic content that is to be delivered over a network. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Ad Selection Based on Potential Revenue Amounts

Techniques are described herein for selecting among advertisements that are competing for a slot based, at least in part, on "potential revenue amounts" that are associated with the advertisements. Each of the potential revenue amounts reflects a value that a provider expects to receive in exchange for the provider's performance of the delivery obligations associated with the advertisements. According to embodiments of the invention, the potential revenue amounts for performing delivery obligations (e.g. the per-page-view revenue of an ad) are considered as a factor independent from the total revenue that may be earned from the corresponding advertisers. In one embodiment, the potential revenue amounts correspond to monetary values that the advertisers offer to pay the provider relative to the ads that are competing for a slot. Other factors that may affect the value expected by the provider include, without limitation, the good will and credit-worthiness of the advertisers.

The potential revenue amount is used as one of the factors for determining which competing ad to place in a slot, where ads that are associated with high potential revenue amounts are favored. For example, if all other factors are equal, the selection mechanism selects ad X over ad Y, if advertiser M is offering to pay a higher amount for placing ad X than advertiser N is offering for placing ad Y.

Various benefits result from using the potential revenue amounts of ads as a factor to select which of the competing ads to include in a slot. For example, a provider is likely to generate more revenue from advertisers, because slots for which many advertisers are competing tend to be assigned to the advertisers that offer to pay more. In addition, latecomer advertisers are less able to "game the system" by adversely affecting pre-existing advertising contracts, since these latecomers are less able to shift slots from earlier-formed contracts to themselves merely by inflating the delivery obligations associated with their advertisements without offering to pay more.

Selecting Technique Examples

As mentioned above, techniques are described herein for using a potential revenue amount as a factor in determining which ad to assign to a slot when there exist multiple ads that are competing for the slot. According to one embodiment, the selection process takes into account a variety of other factors as well, such as the priority class to which the advertisements belong. The advertisements may be divided up, for example, so that ads associated with "guaranteed" contracts belong to a first priority class, and ads associated with "non-guaranteed" contracts belong to a second priority class. In one embodiment, the provider is obligated to serve the ads in the first priority class before serving the ads in the second priority class.

According to one embodiment, the selection process takes the aforementioned factors into account by selecting which ad to insert into a slot based on the following rules:
(1) filter out all advertisements that have delivery criteria that are not satisfied by the attributes of the slot;
(2) filter out all advertisements that are not in the highest remaining priority class; and
(3) select the remaining ad that is associated with the highest potential revenue amount.

Figure 1:
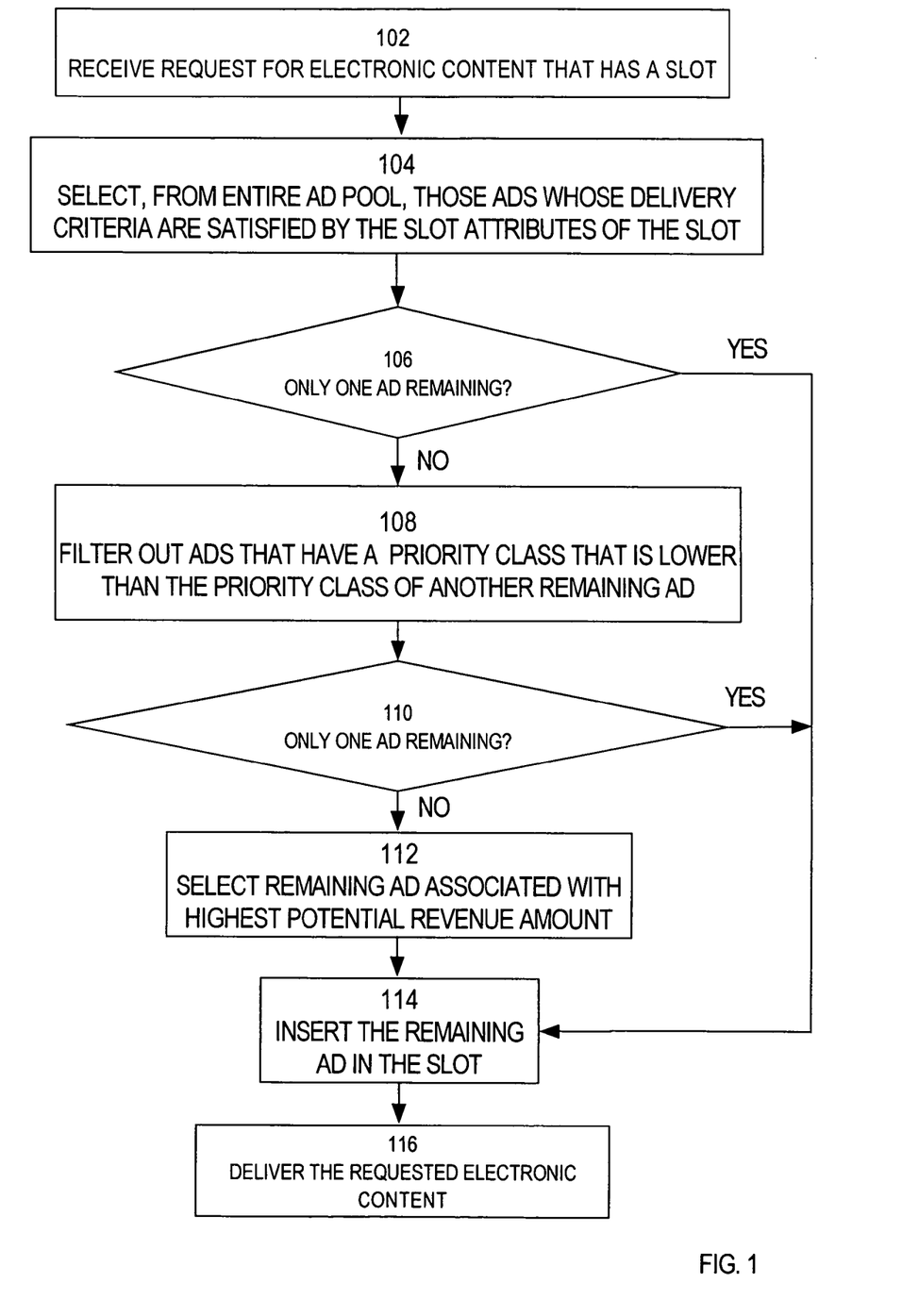
FIG. 1 is a flowchart diagram of one process of selecting an ad, among a plurality of competing ads, for a slot associated with electronic content that has been requested over a network.

Referring to FIG. 1a, it illustrates a flowchart for selecting an ad from a pool of ads to insert into a slot associated with electronic content that has been requested by a user. In one embodiment, the pool of ads are associated with "lines" that advertisers submit to a provider. Each line includes information such as, without limitation, the potential revenue amount of a contract between an advertiser and the provider regarding one or more ads, the date of the contract, the delivery criteria of the ads, and the ads themselves.

At step 102, a request is received for content that has a slot. Such a request may be, for example, a request for a web page that a web server receives from a user over the Internet. At step 104, the ad selection mechanism determines which ads, among the ads in the entire ad pool, have delivery criteria that are satisfied by the slot attributes of the slot. This determination, which is made in response to receipt of the request, may involve a significant amount of computational resources given the number of active advertisement contracts the provider may have entered, the number of delivery criteria that can be associated with each advertisement, and the number of attributes that can be associated with a given slot.

If the delivery criteria of only one ad are satisfied by the slot attributes, then control passes from step 106 to step 114, where the only qualifying ad is inserted into the slot, and from step 114 to step 116, where the requested electronic content is delivered to the user that issued the request.

On the other hand, if the delivery requirements of more than one ad are satisfied by the slot attributes, then control passes to step 108. At step 108, ads that have a priority class that is lower than the priority class of another remaining ad are filtered out of the pool. For example, if the ad pool that remains after step 104 includes two first priority ads and three second priority ads, then during step 104 the three second priority ads would be filtered out of the remaining set of qualifying ads.

If, after filtering out the lower priority ads, only one ad remains, then control passes from step 110 to step 114, where the one remaining ad is inserted into the slot, and from step 114 to step 116, where the requested content is delivered to the user that issued the request.

On the other hand, if more than one ad remains after the lower priority ads have been filtered, then control passes to step 112. At step 112, the remaining ad associated with the highest revenue amount is selected for insertion. Control then passes to step 114, where the selected ad is inserted into the slot, and from step 114 to step 116, where the requested content is delivered to the user that issued the request.

The steps as illustrated in FIG. 1 may be altered and still remain within the scope of the aforementioned selection mechanism. For example, an alternative embodiment of the selection mechanism may include additional steps, eliminate certain steps, or re-order the sequence of the steps.

According to one such embodiment, a provider reserves a portion of an inventory of slots for a group of "qualified" advertisers. The provider selects from the qualified advertisers based, at least in part, on predicted traffic, types of electronic content, and the reputation, financial stability, and history of the advertisers. The advertisers that are selected as "qualified advertisers" qualify for "guaranteed" contracts. If the contracts are indeed entered into, the ads from these qualified advertisers will then be associated with the first priority class, as mentioned above, and will be served before other ads.

As to the non-reserved portion, the provider does not guarantee ad delivery but offers the available slots within the portion to anybody who may still be interested in the slots. In one embodiment, the provider may offer less than the maximum number of the available slots to increase demand. For example, although there are 1,000 available slots, the provider may indicate that 700 slots are available for bidding. As a result, interested advertisers may increase the prices of their bids to ensure that they obtain the slots. In addition, the provider may set an initial bidding price for the interested parties.

Figure 2:
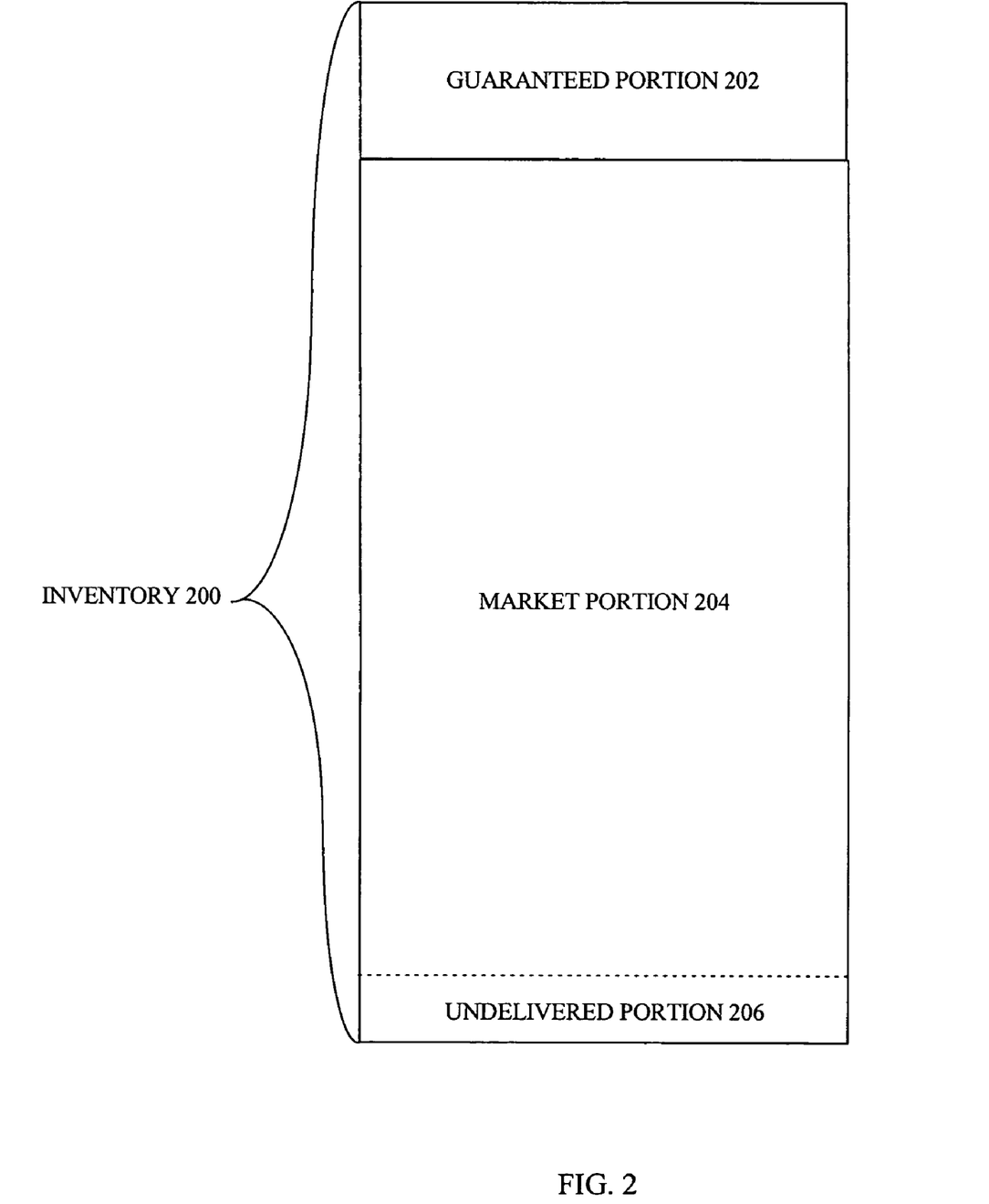
FIG. 2 is a diagram of an inventory model that a provider uses to increase the revenue derived from selling an inventory of slots to advertisers.

FIG. 2 illustrates one inventory model that summarizes the inventory allocation discussed above. Inventory 200 represents all available slots in electronic content that the provider supplies. Guaranteed portion 202 of inventory 200 is reserved for qualified advertisers. The slots in market portion 204 of inventory 200 are allocated to interested parties based, at least in part, on the potential revenue amounts in the contracts between the interested parties and the provider. For example, if advertiser X offers to pay $1000 for a slot in market portion 204, whereas advertiser Y offers to pay $500 for the same slot, the slot is allocated to advertiser X. Because the provider does not guarantee delivery in market portion 204, obligations may exist for the slots in undelivered portion 206, but those obligations may end up not being satisfied.

Figure 3:
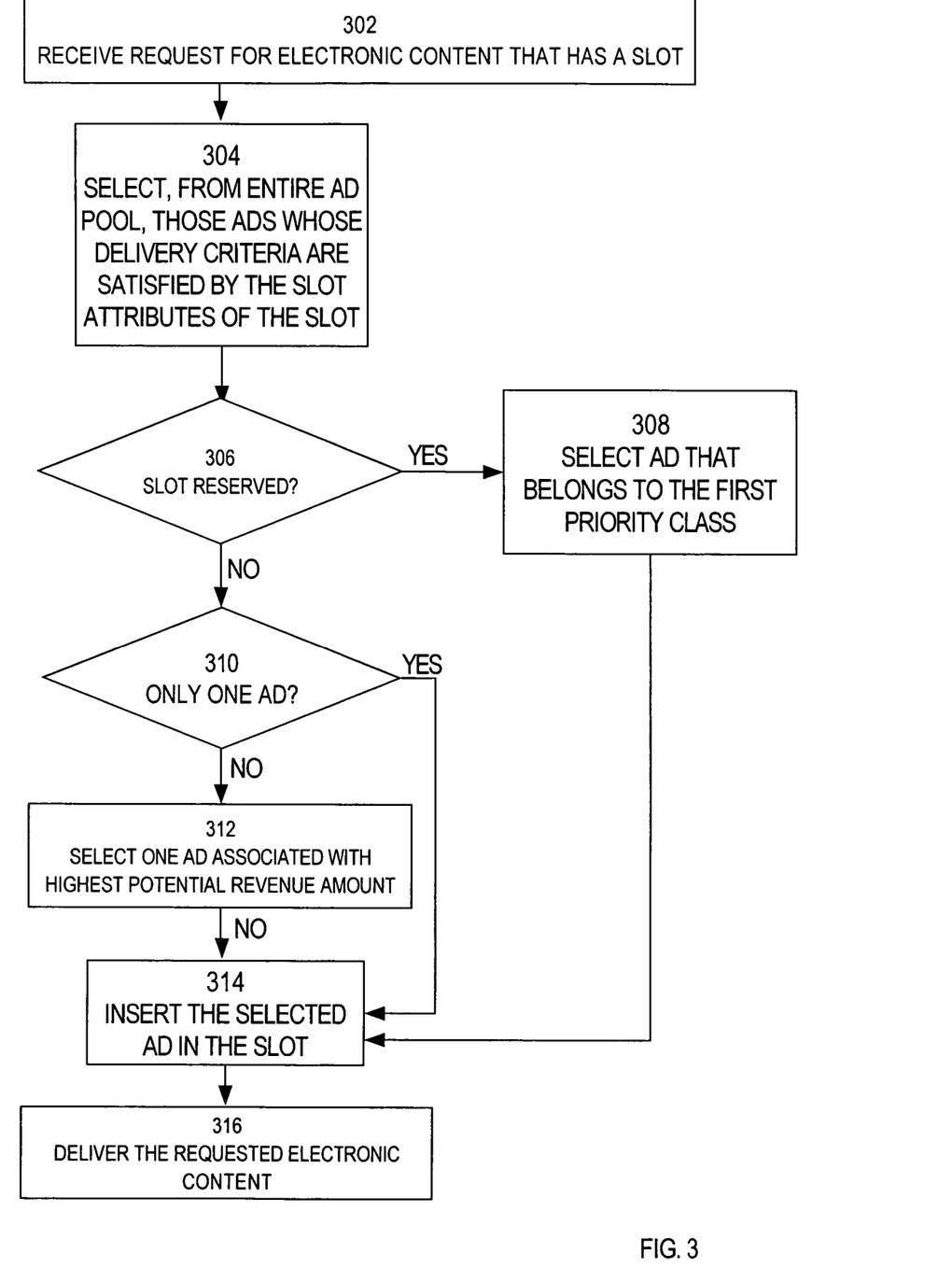
FIG. 3 is a flowchart diagram of an alternative process of selecting an ad, among a plurality of competing ads, for a slot associated with electronic content that has been requested over a network.

With this inventory model, FIG. 3 illustrates an alternative flowchart for selecting an ad from a pool of ads to insert into a slot associated with electronic content that has been requested by a user. At step 302, a request is received for content that has a slot. At step 304, the ad selection mechanism determines which ads, among the ads in the entire ad pool, have delivery criteria that are satisfied by the slot attributes of the slot. Then, the ad selection mechanism at step 306 determines the reservation status of the slot. If the slot has been reserved for the qualified advertisers, then control passes from step 306 to step 308, where an ad is selected if the ad belongs to the first priority class. This qualifying ad is inserted into the slot at step 314 and delivered along with the requested electronic content to the user that issued the request at step 316.

On the other hand, if the slot has not been reserved and only one ad has been selected at step 304, then control passes from step 310 to step 314, where the selected ad is inserted into the slot, and from step 314 to step 316, where the requested content is delivered to the user that issued the request.

If the slot has not been reserved but multiple ads have been selected at step 304, then control passes to step 312. At step 312, the ad associated with the highest revenue amount is selected for insertion. Control then passes to step 314, where the selected ad is inserted into the slot, and from step 314 to step 316, where the requested content is delivered to the user that issued the request.

Hardware Overview

Figure 4:
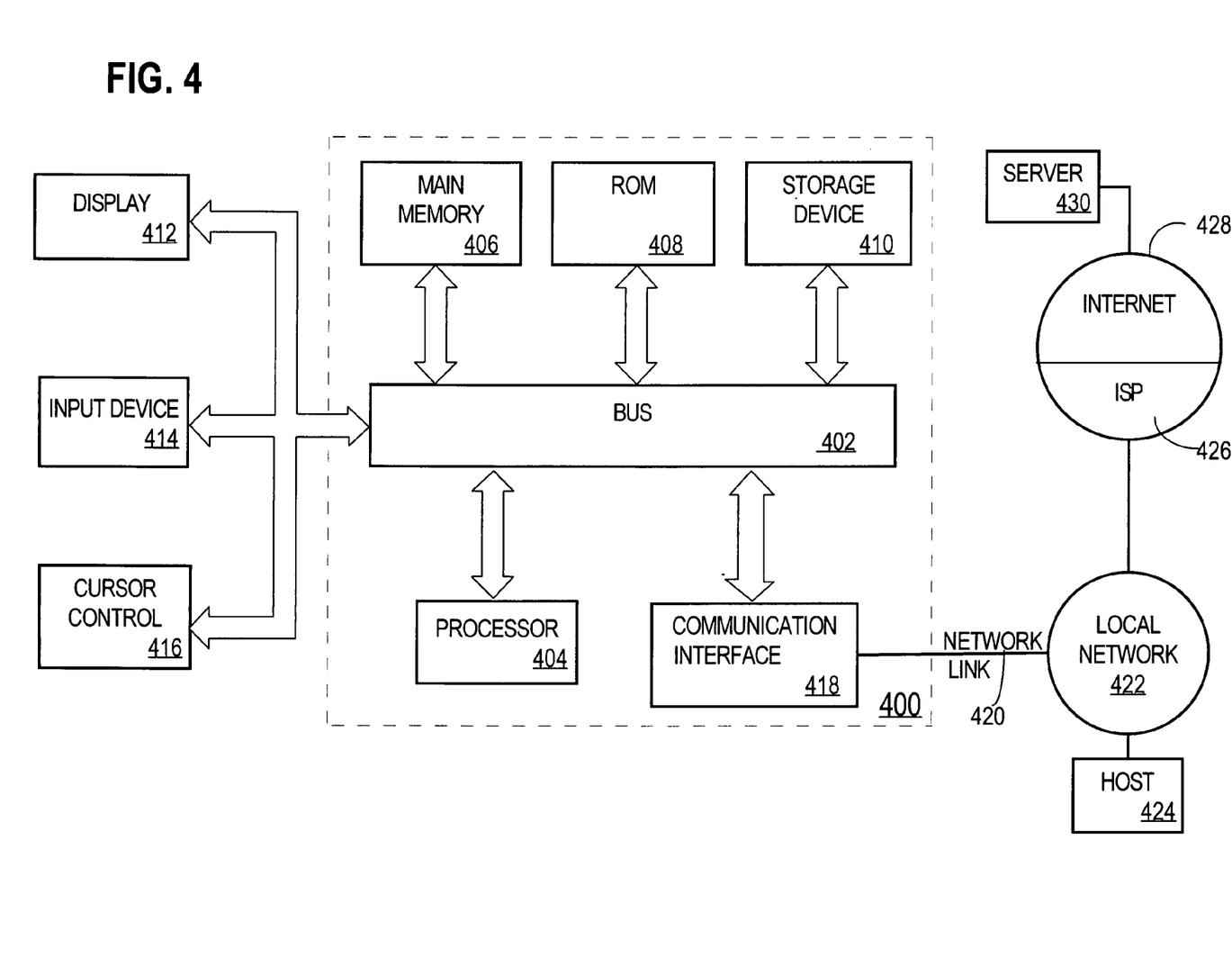
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), a liquid crystal display (LCD), an active matrix display, or other display technologies, for displaying information to a computer user. An input device 414, such as alphanumeric keyboards or voice recognition devices, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for determining which advertisements to include with electronic content delivered to users over a network, the method comprising the steps of:

after accepting a first contract with a first advertiser, accepting a second contract with a second advertiser;

wherein the delivery obligations associated with the second contract are such that fulfillment of the second contract would prevent the delivery obligations of the first contract from being fulfilled;

receiving a plurality of advertisements from a plurality of advertisers;

storing revenue information that indicates potential revenue amounts for the plurality of advertisements, wherein each of the plurality of advertisements is associated with corresponding delivery criteria and a corresponding contract of a plurality of contracts;

wherein the plurality of contracts includes the first contract and the second contract;

wherein the plurality of advertisers includes the first advertiser and the second advertiser;

receiving, from a client that is not one of the plurality of advertisers, a request to provide over the network a piece of electronic content that includes a slot for an advertisement; and in response to receiving the request, performing the steps of:

one or more computing devices comparing slot attributes of the slot with the delivery criteria of the plurality of advertisements to determine a first subset of the plurality of advertisements that qualify for inclusion in the slot, wherein the slot attributes of the slot include at least one of (a) the nature of the piece of electronic content, (b) the size of the slot within the piece of electronic content, or (c) the placement of the slot within the piece of electronic content;

the one or more computing devices creating a second subset of advertisements by filtering, out of the first subset, based on behindness values computed for the advertisements, advertisements whose delivery obligations are on track to be satisfied;

wherein the second subset includes a first advertisement associated with the first contract and a second advertisement associated with the second contract;

wherein the second contract is associated with a behindness value that is currently greater than a behindness value associated with the first contract;

wherein the behindness value of each contract reflects how far behind a content provider is on satisfying the delivery obligations associated with each contract; and selecting the first advertisement from the second subset of advertisements to include in the slot based, at least in part, on the potential revenue amounts;

inserting said first advertisement into the slot to create a modified piece of electronic content;

delivering, as a response to the request, the modified piece of electronic content to the user.

2. The method of claim 1, wherein:

each advertisement of the plurality of advertisements has a corresponding delivery obligation and a corresponding potential revenue amount.

3. The method of claim 2, wherein the selecting the first advertisement to include further comprises:

selecting the first advertisement instead of the second advertisement if the corresponding potential revenue amount of the first advertisement is higher than the corresponding potential revenue amount of the second advertisement.

4. The method of claim 1 wherein the piece of electronic content is a web page.

5. The method of claim 1 wherein the piece of electronic content is a video stream.

6. A computer-readable storage medium storing one or more sequences of instructions which, when executed by one or more processors, causes the one or more processors to perform the steps of:

storing revenue information that indicates potential revenue amounts for the plurality of advertisements that are received from a plurality of advertisers, wherein each of the plurality of advertisements is associated with corresponding delivery criteria and a corresponding contract of a plurality of contracts;

wherein the plurality of advertisements include a first contract with a first advertiser and a second contract with a second advertiser;

wherein the first contract was accepted before the second contract;

wherein the delivery obligations associated with the second contract are such that fulfillment of the second contract would prevent the delivery obligations associated with-the first contract from being fulfilled;

receiving, from a client that is not one of the plurality of advertisers, a request to provide over the network a piece of electronic content that includes a slot for an advertisement; and in response to receiving the request, performing the steps of:

comparing slot attributes of the slot with delivery criteria of a plurality of advertisements to determine a first subset of the plurality of advertisements that qualify for inclusion in the slot;

wherein the slot attributes of the slot include at least one of (a) the nature of the piece of electronic content, (b) the size of the slot within the piece of electronic content, or (c) the placement of the slot within the piece of electronic content;

creating a second subset of advertisements by filtering, out of the first subset, based on behindness values computed for the advertisements, advertisements whose delivery obligations are on track to be satisfied;

wherein the second subset includes a first advertisement associated with the first contract and a second advertisement associated with the second contract;

wherein the second contract is associated with a behindness value that is currently greater than a behindness value associated with the first contract;

wherein the behindness value of each contract reflects how far behind a content provider is on satisfying the delivery obligations associated with each contract; and selecting the first advertisement from the subset of advertisements to include in the slot based, at least in part, on the potential revenue amounts;

inserting said first advertisement into the slot to create a modified piece of electronic content;

delivering, as a response to the request, the modified piece of electronic content to the user.

7. The computer-readable storage medium of claim 6, wherein each advertisement of the plurality of advertisements has a corresponding delivery obligation and a corresponding potential revenue amount.

8. The computer-readable storage medium of claim 7, wherein selecting the first advertisement to include further comprises selecting the first advertisement instead of the second advertisement because the corresponding potential revenue amount of the first advertisement is higher than the corresponding potential revenue amount of the second advertisement.

9. A computer-readable storage medium of claim 6, wherein the piece of electronic content is a web page.

10. A computer-readable storage medium of claim 6, wherein the piece of electronic content is a video stream.

11. The method of claim 1, further comprising:
exclusively offering a first portion of an inventory, of advertisement slots in electronic content, to buyers that satisfy a set of criteria; and
offering a second portion of the inventory to buyers that are not required to satisfy the set of criteria,
wherein the buyers that satisfy the set of criteria and the buyers that are not required to satisfy the set of criteria are advertisers that provide advertisements.

12. The method of claim 11, further comprising:
offering less than the entirety of the second portion of the inventory for purchase to the buyers that are not required to satisfy the set of criteria.

13. The method of claim 12, further comprising:
setting an initial price that the buyers are allowed to bid on the second portion of the inventory.

14. The computer-readable storage medium of claim 6, wherein the instructions include instructions which, when executed by the one or more processors, further causes the one or more processors to perform the steps of:
exclusively offering a first portion of an inventory, of advertisement slots in electronic content, to buyers that satisfy a set of criteria; and
offering a second portion of the inventory to buyers that are not required to satisfy the set of criteria,
wherein the buyers that satisfy the set of criteria and the buyers that are not required to satisfy the set of criteria are advertisers that provide advertisements.

15. The computer-readable storage medium of claim 14, wherein the instructions include instructions which, when executed by the one or more processors, further causes the one or more processors to perform the step of:
offering less than the entirety of the second portion of the inventory for purchase to the buyers that are not required to satisfy the set of criteria.

16. The computer-readable storage medium of claim 15, wherein the instructions include instructions which, when executed by the one or more processors, further causes the one or more processors to perform the step of:
setting an initial price that the buyers are allowed to bid on the second portion of the inventory.

17. The method of claim 1, further comprising:
associating each of the plurality of advertisements with a priority class, wherein the priority class associated with each of the plurality of advertisements indicates whether the corresponding advertisement is the subject of a guaranteed contract;
wherein creating the second subset further includes filtering, out of the first subset, advertisements that have a priority class that is lower than the priority class of any other advertisement that belongs to the first subset before filtering advertisements whose delivery obligations are on track to be satisfied.

18. The computer-readable storage medium of claim 6, wherein the instructions include instructions which, when executed by the one or more processors, further cause the one or more processors to perform the step of:
associating each of the plurality of advertisements with a priority class, wherein the priority class associated with each of the plurality of advertisements indicates whether the corresponding advertisement is the subject of a guaranteed contract;
wherein creating the second subset further includes filtering, out of the first subset, advertisements that have a priority class that is lower than the priority class of any other advertisement that belongs to the first subset before filtering advertisements whose delivery obligations are on track to be satisfied.

* * * * *